United States Patent [19]

Weinheimer

[11] Patent Number: 5,060,697
[45] Date of Patent: Oct. 29, 1991

[54] EXTRUDED BUCKLING-RESISTANT INSERTION MOUNTABLE DRAIN OR VENTING HOSE FOR POSITIONING IN A HOLLOW SPACE OF A MOTOR VEHICLE BODY

[75] Inventor: Heinz-Jürgen Weinheimer, Hagen, Fed. Rep. of Germany

[73] Assignee: Kunststoffwerk Voerde Hueck & Schade, Ennepetal-Voerde, Fed. Rep. of Germany

[21] Appl. No.: 576,580

[22] Filed: Aug. 31, 1990

[30] Foreign Application Priority Data

Sep. 1, 1989 [DE] Fed. Rep. of Germany ....... 3929051

[51] Int. Cl.⁵ ........................ F16L 9/18; F16L 11/00
[52] U.S. Cl. ................................. 138/121; 138/115; 138/113; 138/111; 181/271
[58] Field of Search ............... 138/114, 115, 121, 122, 138/137, 148, 172, 173, 177, 178; 74/502.5; 98/DIG. 7; 254/134.3 FT; 181/271

[56] References Cited

U.S. PATENT DOCUMENTS

| 1,959,368 | 5/1934 | Kennedye | 138/114 |
| 3,314,449 | 4/1967 | Kvone | 138/137 |
| 4,140,154 | 2/1979 | Kanao | 138/122 |
| 4,350,547 | 9/1982 | Kanao | 138/122 |
| 4,410,012 | 10/1983 | Redding | 138/121 |

FOREIGN PATENT DOCUMENTS

| 8800738 | 5/1988 | Fed. Rep. of Germany . | |
| 402483 | 4/1909 | France | 138/173 |
| 3322378 | 3/1985 | Netherlands | 138/177 |

*Primary Examiner*—Philip R. Coe
*Assistant Examiner*—Terrence R. Till
*Attorney, Agent, or Firm*—Herbert Dubno

[57] ABSTRACT

An extruded buckling-resistant longitudinally insertable drain or venting hose of PVC or a similar thermoplastic material which can be mounted in inaccessible hollows of a conveyance, especially a motor vehicle body, has longitudinally-extending radial ribs coextruded with the PVC body and composed preferably of chlorinated polyethylene. As a result, the hose has improved sound-damping properties and can be more readily inserted into place.

5 Claims, 1 Drawing Sheet

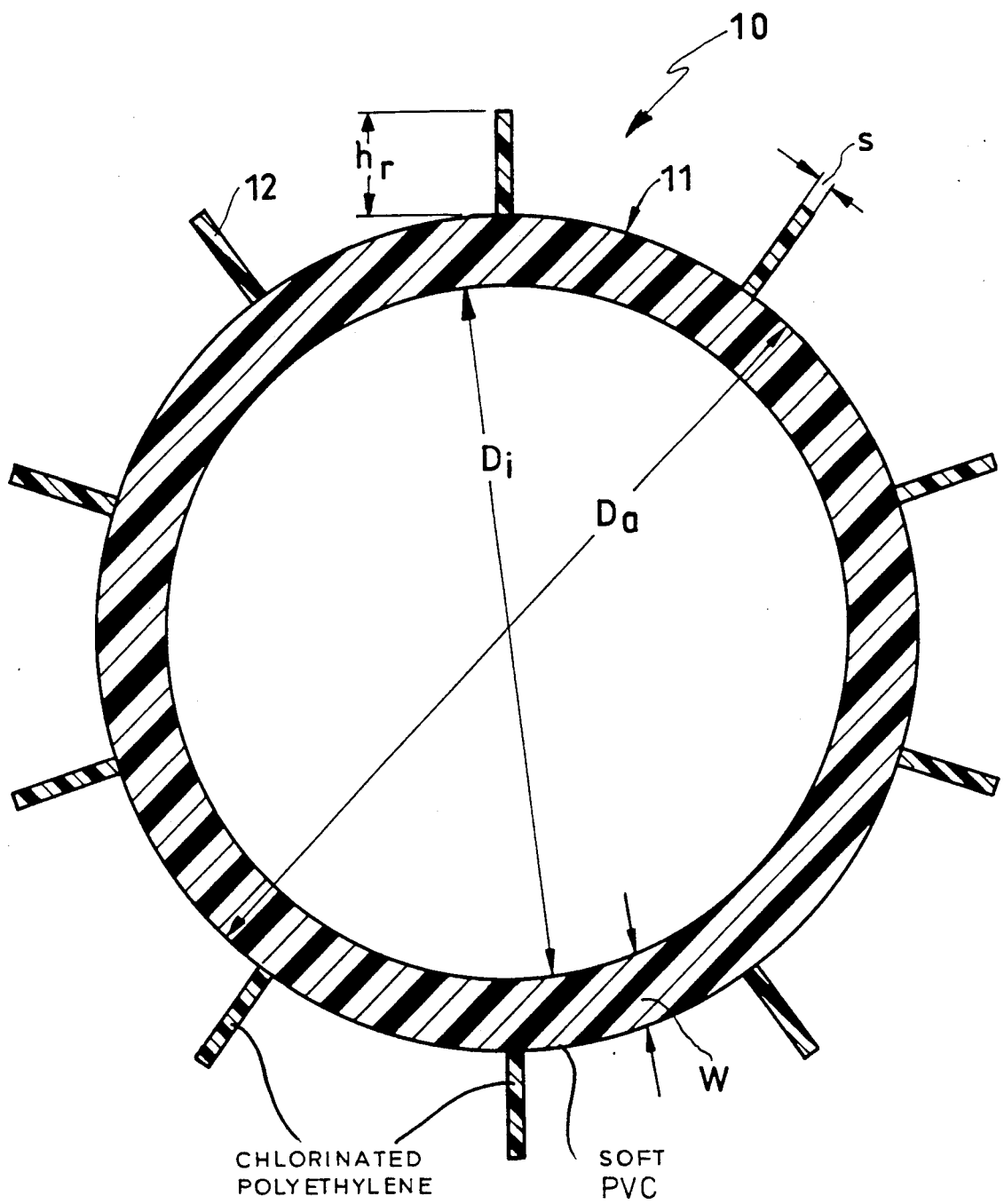

EXTRUDED BUCKLING-RESISTANT INSERTION MOUNTABLE DRAIN OR VENTING HOSE FOR POSITIONING IN A HOLLOW SPACE OF A MOTOR VEHICLE BODY

FIELD OF THE INVENTION

My present invention relates to a buckling-resistant insertion mountable drain or venting hose which can be mounted in hollow spaces of a motor vehicle body and, more particularly, to a hose which can be fed into a hollow space of a vehicle, especially a motor vehicle body, e.g. through an opening at one end of the space or through a wall of the vehicle body and which has sufficient stiffness to enable comparatively long lengths of the hose to be advanced into such spaces without buckling and yet will not tend to chatter against surfaces of the vehicle body when in place therein.

BACKGROUND OF THE INVENTION

It is frequently necessary to insert drain (overflow) or venting hoses into cavities of a conveyance, especially a motor vehicle body which may not be readily accessible and to which access may be only had from an end thereof. Such hoses, therefore, must be fed from the end, e.g. through a wall of the vehicle body, into such cavities and, for that purpose, must have sufficient stiffness or buckling resistance to enable the hose to be fed longitudinally even where such movement is frictionally retarded by walls of the body into proper position.

While I am not aware of any publication describing the provision of such hoses having thin-walled longitudinal ribs extending generally radially from an outer surface thereof, I am aware that such hoses, composed entirely of polyvinylchloride, have been utilized in practice.

More common, however, are smooth-surfaced hoses with low-friction outer surfaces, composed of soft polyvinylchloride having a hardness of substantially 85 to 90 Shore A. These hoses have a limited bendability and sufficient buckling resistance to enable them to be inserted longitudinally from an end of a receiving cavity or space or in a through-the-wall manner. They are used in long motor vehicle body channels or spaces which are not readily accessible from the exterior and can be effectively inserted in the manner described.

However, the smooth-surfaced PVC hoses can chatter against the vehicle body and to avoid this, such hoses have frequently been wound with a self-adhesive felt wrap, especially at those locations at which the noise generation is most pronounced. The use of felt wraps increases the cost of the system and the time which is required to emplace the hose.

The ribbed hoses hitherto employed composed of polyvinylchloride, for example, and having the ribs constituted of the same material as the remainder of the hose, does not solve the problem because the ribs do not reduce the noise generated by chattering and, indeed, frequently impede the through-the-wall or longitudinal insertion mode of positioning the hose.

Indeed, resistance to longitudinal insertion may be so great that such longitudinally ribbed hoses cannot be used in many longitudinal-insertion applications and as a result, in practice, the smooth-walled hose, with its felt wrapping, is more commonly employed.

OBJECTS OF THE INVENTION

It is, therefore, the principal object of the present invention to provide an improved drain or vent hose, especially for longitudinal insertion into an elongated space or channel in a motor vehicle body, in which the chattering noise can be reduced or eliminated and which nevertheless can be readily inserted in a through-the-wall or longitudinal feed manner without difficulty.

Another object of this invention is to provide a drain or venting hose for the purposes described which has improved acoustic properties and ease of mounting.

It is also an object of the invention to provide an improved hose for the purposes described and for mounting in a motor vehicle body as described, which is free from the disadvantages of earlier hoses as described.

SUMMARY OF THE INVENTION

These objects and others which will become apparent hereinafter are attained, in accordance with the invention in an extruded buckling-resistant drain or venting hose for insertion into a cavity of a conveyance by feeding the hose progressively longitudinally into the cavity, especially in an automotive-vehicle body, the hose comprising:

a longitudinally extending tubular hose body composed of an extruded thermoplastic synthetic resin; and a plurality of thin-walled longitudinal ribs coextruded with the body and projecting generally radially outwardly therefrom, the ribs being composed of an extruded synthetic resin fusible with that of the body upon coextrusion therewith and having a hardness less than that of the body.

Advantageously, the body is composed of polyvinylchloride and the ribs have a hardness of about 55 to 65 Shore A.

The ribs are preferably composed of chlorinated polyethylene or another synthetic resin having a lower coefficient of sliding friction than that of the synthetic resin constituting the body.

In a preferred embodiment of the invention, the tubular body has a circular cross section, an inner diameter $D_i$, an outer diameter $D_a$ and a wall thickness w, and said ribs have a radial height $h_r$ and a wall thickness s, the inner diameter, outer diameter, wall thicknesses and height being determined by the relationship:

$$1.08 < D_a:D_i < 1.33$$

$$0.087 < w:D_i < 0.106$$

$$0.124 < h_r:D_i < 0.151$$

$$0.062 < s:D_i < 0.091.$$

In accordance with the invention, therefore, the ribs are coextruded with the tubular body of the hose and are composed of chlorinated polyethylene and preferably a chlorinated polyethylene having a substantially lower hardness than that of the soft PVC of the hose body (85–90 Shore A), i.e. a hardness of about 55–65 Shore A.

Chlorinated polyethylene is a plastic similar to that of the soft PVC and which is thus readily weldable and meltable to bond therewith when it is coextruded with the soft PVC.

The coextrusion can be effected in a known manner in that in a single extruder head in brief sequence, i.e. at a distance of less than 3 cm, a hose body is initially formed from soft PVC and while the hose body still has a soft and melt-like consistency, immediately thereafter, the ribs in a melt-flowable state are formed by extrusion on that body, i.e. coextruded therewith.

Because the chlorinated polyethylene is substantially softer than the hose body, the ribs are readily deflectable against the walls of the vehicle body and provide a high degree of sound-damping, minimizing the noise generation.

The sound damping effect also depends upon the dimensions and shape of the thin-walled ribs. Advantageously, at least 10 ribs are angularly equispaced about the circular cross section hose body. The sound-damping effect appears to be, therefore, a result of the combination of the shape of the ribs and the material from which they are formed and the nature of sound-transmission between the ribs and the tubular body with which they are coextruded.

A surprising and important advantage of the hose of the invention is that it can be inserted longitudinally in a through-the-wall manner in vehicle bodies with especial ease and in a simple manner because of the reduced friction afforded by the ribs.

The phenomenon can be demonstrated easily in a simple experiment. A conventional hose is placed upon a glass plate and an attempt is made to move the hose along the plate with the hand in the longitudinal direction. Surprisingly, it is found that the friction between the hose and the plate makes this difficult. This is because the ribs of the soft PVC appear to act like rubber erasers on the glass surface and to frictionally adhere thereto. When the axial ribs are composed of chlorinated polyethylene, surprisingly, the hose can be slid more readily on the glass plate.

While chlorinated polyethylene is the preferred material and the material of the best mode for the outer axial ribs of the hose whose body is composed of soft PVC and the soft PVC and chlorinated polyethylene constitute a particularly preferred pairing of the synthetic resin material or plastics, it is possible to substitute for a chlorinated polyethylene, a plastic which has melting properties similar to that of the tube body, a reduced hardness by comparison to that of the tube body and with a lower coefficient of sliding friction or better sliding properties.

BRIEF DESCRIPTION OF THE DRAWING

The above and other objects, features and advantages of the present invention will become more readily apparent from the following description, reference being made to the accompanying drawing, the sole FIGURE of which is a transverse cross section through a drain or venting hose for the purposes described, drawn to a greatly enlarged scale.

SPECIFIC DESCRIPTION AND EXAMPLE

In the drawing I have shown a drain or venting hose which is resistant to buckling and can be inserted longitudinally in a through-the-wall manner into an inaccessible space in a motor vehicle body as has been described. The hose 10 is composed of a tubular body 11 of circular cross section, constituted of soft PVC with a hardness of about 85 to 90 Shore A.

Coextruded with body 11 are radially outwardly-projecting relatively thin-walled axial ribs 11 of that rectangular cross section and constituted of chlorinated polyethylene and having a hardness of about 55 to 65 Shore A.

The outer diameter $D_a$ of the tubular body 11 can be about 17.5 mm while its inner diameter $D_i$ is about 14.5 mm. The wall thickness w can be approximately 1.4 mm while the radial rib height $h_r$ amounts to about 2 mm. Thickness s of the ribs 12 can be about 1 to 1.2 mm.

I claim:

1. An extruded buckling-resistant drain or venting hose for insertion into a cavity of a conveyance by feeding the hose progressively longitudinally into the cavity, especially in an automotive-vehicle body, said hose comprising:
   a longitudinally extending tubualr hose body composed of an extruded thermoplastic synthetic resin; and
   a plurality of thin-walled longitudinal ribs coextruded with said body and projecting generally radially outwardly therefrom, said ribs being composed of an extruded synthetic resin fusible with that of said body upon coextrusion therewith and having a hardness less than that of said body such that said ribs are readily deflectable against walls of said vehicle body and provide a high degree of sound-damping, thereby minimizing noise generation.

2. The extruded buckling-resistant hose defined in claim 1 wherein said body is composed of polyvinylchloride and said ribs have a hardness of about 55 to 65 Shore A.

3. The extruded buckling-resistant hose defined in claim 2 wherein said ribs are composed of chlorinated polyethylene.

4. The extruded buckling-resistant hose defined in claim 1 wherein said ribs are composed of a synthetic resin having a lower coefficient of sliding friction than that of the synthetic resin constituting said body.

5. The extruded buckling-resistant hose defined in claim 1 wherein said tubular body has a circular cross section, an inner diameter $D_i$, an outer diameter $D_a$ and a wall thickness w, and said ribs have a radial height $h_r$ and a wall thickness s, the inner diameter, outer diameter, wall thicknesses and height being determined by the relationship:

$$1.08 < D_a{:}D_i < 1.33$$

$$0.087 < w{:}D_i < 0.106$$

$$0.124 < h_r{:}D_i < 0.151$$

$$0.062 < s{:}D_i < 0.091.$$

* * * * *